E. O. SCHWEITZER.
MEANS FOR CONTROLLING AND MEASURING A CURRENT FLOWING IN AN ALTERNATING CURRENT CIRCUIT.
APPLICATION FILED FEB. 13, 1919.
1,422,484.
Patented July 11, 1922.
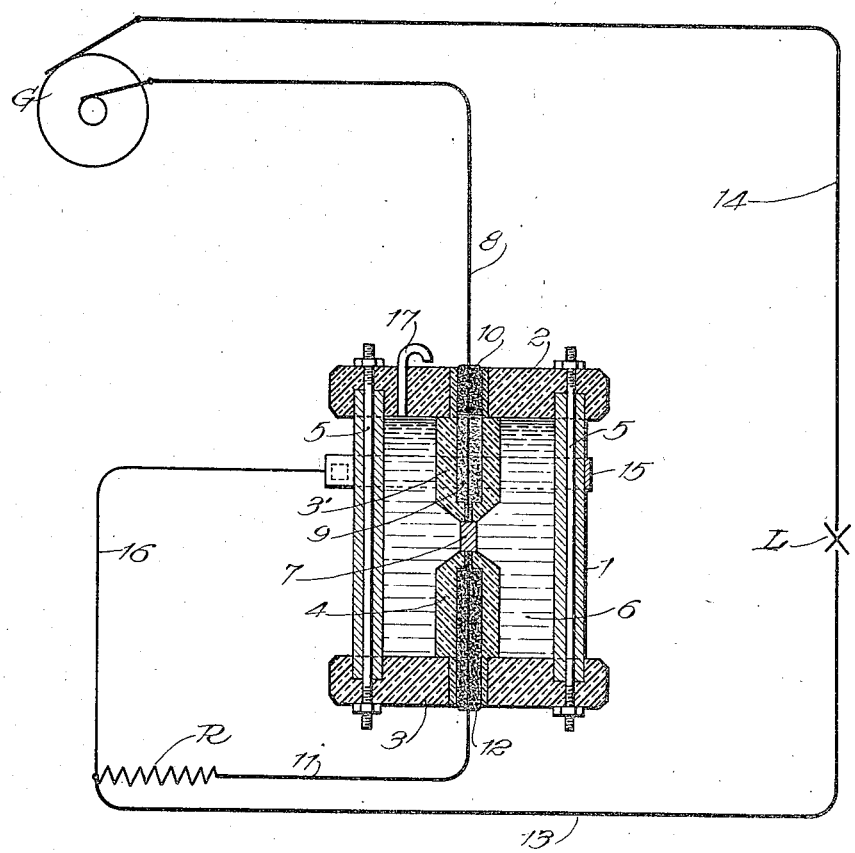

UNITED STATES PATENT OFFICE.

EDMUND O. SCHWEITZER, OF CHICAGO, ILLINOIS.

MEANS FOR CONTROLLING AND MEASURING A CURRENT FLOWING IN AN ALTERNATING-CURRENT CIRCUIT.

1,422,484.   Specification of Letters Patent.   Patented July 11, 1922.

Application filed February 13, 1919. Serial No. 276,766.

*To all whom it may concern:*

Be it known that I, EDMUND O. SCHWEITZER, a citizen of the United States, residing at Chicago, in the county of Cook and State of Illinois, have invented a certain new and useful Improvement in Means for Controlling and Measuring a Current Flowing in an Alternating-Current Circuit, of which the following is a full, clear, concise, and exact description, reference being had to the accompanying drawings, forming a part of this specification.

My invention relates to means for controlling and measuring a current flowing in an alternating current circuit, and is especially concerned with the provision of electrolytic means for interrupting a circuit in which alternating current is flowing when a predetermined quantity of current has passed through such circuit.

One of the objects of my invention is to provide means of the character described forming an improvement over the means disclosed in my Patent No. 1,254,939, of January 18, 1918.

A second object of my invention is to provide a simple electrolytic cell which can be connected in series with an alternating current circuit, and which will function to open said circuit when a predetermined quantity of current has passed therethrough, the cell having such characteristics that it is unnecessary to use rectifiers, as disclosed in my patent above referred to, to rectify the current passing through the electrolytic cell.

A still further object of my invention is to provide means for interrupting an alternating current circuit when a predetermined quantity of current has passed therethrough, the said means being simple in construction and economical to manufacture.

Other objects will appear as this description progresses, reference being had to the accompanying drawing, in which the figure discloses one form of my improved electrolytic meter in longitudinal section, the connections between my meter and the load circuit being shown in a more or less diagrammatic manner.

Through a large number of experiments I have discovered that an electrolytic cell having one electrode formed of copper, zinc, or other metal which will go into solution when subjected to electrolysis, and the other electrode formed of material such as carbon or graphite which will not go into solution when subjected to electrolysis, in combination with an electrolyte which will not electrolyze under the voltages which are imposed upon the electrolytic cell, has certain characteristics which makes it valuable for measuring current flowing in an alternating current circuit. My experiments have disclosed that in such a cell, when an alternating current is imposed thereon, there appears to be a greater resistance to the passage of the current from the carbon to the copper electrode than from the copper electrode to the carbon electrode. This condition prevails only so long as the voltage imposed upon the electrodes is insufficient to cause the formation of any substantial quantities of gas upon the electrodes. In a cell constructed with carbon and graphite electrodes and an electrolyte of neutral copper sulphate I have found that the critical voltage at which the formation of gas takes place is approximately 1.75 volts. At this voltage gas will be liberated continuously at both electrodes, and the selective resistance effect of the dissimilar electrodes largely disappears. In practice this critical voltage is somewhat above its theoretical value.

By reason of the selective resistance effect of dissimilar electrodes, discussed above, more current flows away from the copper electrode than flows to it, and, as a result, the copper electrode is gradually disintegrated. I have taken advantage of this selective resistance effect of dissimilar electrodes to construct the electrolytic cell which I shall now describe. In the description of this cell and for the purpose of convenience I shall use the word "active" to describe the electrode which is made of copper, zinc, or other metal which goes into solution in a suitable electrolyte under electrolytic action, and for a similar purpose I shall use the expression "inactive" to describe the electrode which is formed of carbon, graphite, or other material which does not go into solution under electrolytic action.

Referring to the figure, the reference character 1 indicates a cylinder formed of carbon, graphite, or other similar material, which forms the inactive electrode of my improved electrolytic cell. Two caps 2 and 3, respectively, of hard rubber, or other suitable insulating material, close the ends of the cylinder 1 and form supports for the inwardly extending hard rubber tubes 3′ and 4, respectively. Bolts 5 of any suitable material clamp the caps 2 and 3 to the ends of the cylinder 1, thereby forming a fluid-tight container for receiving the electrolyte 6.

The reference character 7 indicates the active electrode of my improved cell, the mass of which is predetermined to interrupt the load circuit after a predetermined quantity has passed therethrough, and for that reason I sometimes designate the active electrode as the measured or rated electrode. The active electrode 7 is supported between the adjacent ends of the tubes 3 and 4. A conductor 8 connects a source of alternating current, which is conventionally shown as comprising an alternating current generator G, with one end of the active electrode 7. This conductor passes through the tube 3′ and is surrounded by paraffine 9 in the lower end of the tube 3. The upper end of the tube 3 is closed by means of a bituminous or any other suitable insulating material which is indicated by the reference character 10. A second conductor 11 connects the opposite end of the active electrode with a non-inductive resistance R. The conductor 11 passes through the tube 4 and is sealed therein by means of insulating material 12. The resistance R is connected by means of the conductor 13 with the load L, and the load L is in turn connected with a generator G by means of the conductor 14. A copper band 15 is clamped around the cylinder 1 and is connected by means of a conductor 16 to the end of the resistance R remote from the cell. The reference character 17 indicates a small capillary vent tube which extends through the cap 2 to permit any gases which may be formed in the cell to escape.

In practice the resistance R is made of such value that at no time will a potential of more than 1.75 volts be imposed upon the electrolytic cells. Under these conditions I find that the active electrode 7 is gradually disintegrated and in time is completely disintegrated and removed. The current thereupon passes from the end of the conductor 8 to the end of the conductor 11 through the electrolyte and on account of the high resistance of the electrolyte it rapidly heats to a temperature sufficient to melt the paraffine 9 which runs down over the ends of the conductor 8 and completely insulates the end of this conductor so that the circuit is completely interrupted.

I have constructed a number of cells which embody my invention as above described and tested them upon alternating current circuits operated at a potential of substantially 118 volts. In some cases the current was held constant at 5 amperes, and in other cases the current was varied from 2.6 to 5 amperes, and the cells were operated over considerable periods of time. During these tests the active electrodes, which were formed of copper, with constant load lost approximately .00216 grams per ampere hour, and with a variable load there was an average loss of approximately .000232 grams per ampere hour. In these cells the active electrode of copper weighed at the beginning of the tests .5 gram and the inactive electrode 1 was made of graphite. The electrolyte which I employed was an approximate ten per cent solution of C. P. copper sulphate (sp. gra. 1.065).

As graphite is somewhat porous it is necessary to coat the outer side of the graphite cylinder with some sort of water-proof material in order to prevent the escape of the electrolyte. This can be suitably accomplished by coating the exterior of the graphite cylinder with bakelite varnish and then baking the same. Other materials can be used for this purpose, but they should be of such character that they will not melt at the temperature which the cell reaches upon interruption of the circuit by the disintegration of the active electrode and prior to the melting of the paraffine.

While I have described the inactive electrode as being composed of carbon or graphite it also can be constructed of other material, such for instance as tantalum or aluminum.

After cells constructed as above described have been in operation for sometime it is found that the distribution of copper removed from the active electrode of the cell is not the same in every cell. In some of the cells a large proportion of the copper was precipitated in the form of finely divided particles of spongy copper, while in others scarcely any copper was found resting in the bottom of the cell. In every case, however, the deposit on the graphite wall was uniformly distributed and consisted of fine particles of spongy copper clinging tightly to the inner walls of the cells and when the larger parts were scraped off a quite smooth copper plating could be detected underneath. It would seem that under such conditions the copper deposit on the carbon electrode would be electrolyzed and deposited back upon the copper electrode, but my investigations have proved that this action does not take place, and although I am not certain of the cause of this mode of operation, I believe that it is due to the high contact resistance between the carbon and copper deposited thereon. In any event, my investigations have disclosed that the rate at which the active electrode is disintegrated bears such a uniform relation to the amount of current flowing through the load circuit that it can be used commercially as a measure of the amount of current consumed in the load circuit. In constructing electrolytic meters of the type which I have just described great care must be exercised to insure that the active electrode is absolutely clean. Otherwise the rate of disintegration of the active electrode will not be uniformly proportional to the flow of current through the load circuit.

While I have described the details of the preferred embodiments of my invention, it is to be understood that it is capable of other adaptations and modifications within the scope of the appended claims.

Having thus described my invention, what I claim is:—

1. The combination with an alternating current circuit, of a measured electrode connected in series therewith, electrolyte in which said electrode is immersed, a container for said electrolyte comprising a cylindrical carbon electrode and means for shunting a part of the current flowing in said circuit through said measured electrode, electrolyte, and carbon electrode at a rate insufficient to cause the formation of gas at said electrodes.

2. The combination with an alternating current circuit of a measured electrode connected in series therewith, electrolyte in which said electrode is immersed, a carbon electrode and means for shunting a part of the current flowing in said circuit through said measured electrode, electrolyte and carbon electrode.

3. The combination with an alternating current circuit, of a measured active electrode, an inactive electrode, electrolyte for said electrodes and means for shunting a proportional part of the current flowing in said circuit through said active electrode, said electrolyte and said inactive electrode at a rate insufficient to cause the formation of gas at said electrodes.

4. The combination with an alternating current circuit, of a measured active electrode, an inactive electrode, electrolyte for said electrodes and means for shunting a proportional part of the current flowing in said circuit through said active electrode, said electrolyte and said inactive electrode.

5. An electrolytic meter comprising a hollow carbon cylinder forming a container, electrolyte in said container, a measured copper electrode supported in said electrolyte, means for connecting said measured electrode in series with the circuit in which the current consumption is to be measured and means for connecting said container to said circuit at a point spaced from said rated electrode.

6. An electrolytic meter comprising a hollow inactive electrode forming a container, electrolyte in said container, a measured active electrode immersed in said electrolyte, means for connecting said electrode in series with the circuit in which the current consumption is to be measured and means for shunting a proportional part of said current through said measured electrode, said electrolyte and said inactive electrode at a rate insfficient to cause the formation of gas at said electrodes.

7. An electrolytic meter comprising an inactive electrode, a measured active electrode, electrolyte for said electrodes, means for connecting said measured electrode in series with a circuit and means for shunting a portion of the current in said circuit through said measured electrode, said electrolyte and said inactive electrode.

8. The combination with an alternating current circuit, of a measured electrode connected in series with said circuit and means for disintegrating said electrode at a rate proportional to the flow of current in said circuit comprising a single cell of which said measured electrode forms an electrode.

9. The combination with an alternating current load circuit, of means for interrupting said circuit after a predetermined amount of current has flowed therethrough comprising a single cell, one electrode of which is formed by a portion of said circuit.

10. The combination with an alternating current circuit, of means for interrupting said circuit comprising a single unitary means for rectifying a portion of the current passing through said circuit and disintegrating a portion of said circuit.

In witness whereof, I hereunto subscribe my name this 10th day of February, 1919.

EDMUND O. SCHWEITZER.

Witnesses:
ROBERT D. TURGEON,
ELMER D. KOELSCH.